United States Patent Office 2,711,991
Patented June 28, 1955

2,711,991

PRODUCTION OF PURE ADIPONITRILE

Adolf Hrubesch and Otto Schlichting, Ludwigshafen (Rhine), Germany, assignors to Badische Anilin- & Soda-Fabrik Aktiengesellschaft, Ludwigshafen (Rhine), Germany No Drawing. Application October 10, 1952, Serial No. 314,229

Claims priority, application Germany October 13, 1951

3 Claims. (Cl. 202—57)

This invention relates to an improved process for the production of pure adiponitrile from adiponitrile containing 1-cyanocyclopentanone-(2) or its imide.

The production on a large technical scale of pure adiponitrile (adipic acid dinitrile) with a high setting point and a good coefficient of refraction is difficult. Usually it is necessary to subject the adiponitrile obtained by the various processes to a special purification process, for example a purification with aqueous solutions of inorganic acids. In this way the main impurity, 1-cyanocyclopentanone-imide-(2), is converted into the ammonium salt of the acid used for the purification and into 1-cyanocyclopentanone-(2); after filtration or washing out the ammonium salt with water, the said compound can be separated from the adiponitrile more simply than its imide by distillation over a concentrating column. Thus when working on a technical scale, the purification necessitates either a filtration, by which losses of nitrile occur, or repeated washing with water with subsequent separation of the two liquids, by which the adiponitrile absorbs a higher percentage of water. Thus for the subsequent distillation an additional dehydration stage is necessary.

We have now found that such a purification with its additional technical operations can be avoided by treating the adiponitrile containing 1-cyanocyclopentanone-(2) or its imide with hydrocyanic acid or substances which are capable of yielding hydrocyanic acid under the conditions of the process. The 1-cyanocyclopentanone-(2) and also its imide are thereby converted by the hydrocyanic acid even at room temperature, but much more rapidly at elevated temperature, into products which cannot be distilled or which can only be distilled with difficulty and with decomposition. In the subsequent distillation these remain behind as a distillation residue. Pure adiponitrile is directly obtained, besides the usual much more readily volatile first runnings.

The process may be carried out differently depending on the process employed for the production of the adiponitrile. Thus for example in the production of adiponitrile from 1.4-dichlorobutane there may be added, after the reaction with sodium cyanide, at 60° to 100° C. small amounts, depending on the imide content, of hydrochloric, sulfuric or phosphoric acids, alkyl or aryl sulfonic acids containing, if desired, a little water, preferably below the surface. In the catalytic production of adiponitrile from adipic acid and ammonia there may be supplied for example in the last third of the catalyst chamber or to the vapors leaving the catalyst chamber predetermined amounts of hydrocyanic acid, formamide or methyl formate together with ammonia. Temperatures above 160° C. are necessary only in the last case.

The following examples will further illustrate this invention but the invention is not limited to these examples. The parts are by weight.

Example 1

A mixture of 200 parts of pure adiponitrile (freezing point 2° C.) and 20 parts of 1-cyanocyclopentanone-imide-(2) is heated to 60° to 80° C. and hydrocyanic acid is led in until there has been an increase in weight of about 7 to 10 parts. It is left at 60° to 100° C. for 1 to 2 hours and is then distilled in vacuo. 196 parts of adiponitrile (boiling point 154° to 155° C. at 10 torr) are obtained having the refractive index $n_D^{20}=1.4372$ and a freezing point of 1.7° to 2.1° C. The distillation residue amounts to 28 parts and can be worked up to adipic acid and glutaric acid.

The same result is obtained if the adiponitrile contains instead of 1-cyanocyclopentanone-imide-(2) equivalent parts of 1-cyanocyclopentanone-(2) or a mixture of said ketone and its imide.

Example 2

800 parts of dried sodium cyanide (95 per cent) are added to 700 parts of pure adiponitrile, and the former reacted with 880 parts of 1.4-dichlorobutane while stirring at 180° to 190° C. in known manner. A pasty reaction product is obtained which contains adiponitrile and less than 1 to 2 per cent of impurities which boil lower than adiponitrile. The impurities amount to 0.2 per cent calculated on the basic substance (about 3 parts). They consist substantially of 1-cyanocyclopentanone-imide-(2). While stirring further at 40° to 100° C. there are slowly added at the bottom of the reaction vessel about 2 to 3 parts of concentrated sulfuric acid, if desired diluted to 50 per cent with water, and stirring is continued for 1 to 2 hours. By working up by distillation there are obtained, besides 14 parts of first runnings of chlorine-containing products, 660 parts of newly-produced pure adiponitrile (in addition to that originally present). Its coefficient of refraction is $n_D^{20}=1.4374$ and its freezing point is 1.9° C.

Example 3

Ammonia is led through molten adipic acid at 330° to 350° C. The resulting adiponitrile containing 0.35 per cent of 1-cyanocyclopentanone-imide-(2) is entrained with the stream of ammonia and, after the addition of 0.2 to 0.25 per cent of formamide, is led at about 200° to 300° C. over a short layer of pieces of chammote containing phosphoric acid. The adiponitrile obtained then contains less than 0.1 per cent of cyanocyclopentanone-imide.

What we claim is:

1. An improved process for the production of pure adiponitrile from crude adiponitrile containing as impurities a member of the group consisting of 1-cyanocyclopentanone-(2) and its imide which comprises reacting substantially anhydrous hydrocyanic acid upon said crude adiponitrile at about 40° to 300° C. and distilling the purified adiponitrile from the remaining high-molecular reaction products of the hydrocyanic acid with said impurities.

2. An improved process for the production of pure adiponitrile from the technical reaction mixture obtained by reacting 1,4-dichlorobutane upon excess sodium cyanide at 180° to 190° C. which comprises adding at about 40°–100° C. a member of the group consisting of hydrochloric, sulfuric and phosphoric acids containing up to 50 per cent. of water to said reaction mixture in an amount not substantially exceeding the amount necessary for setting free hydrocyanic acid sufficient to bind all 1-cyanocyclopentanone-(2)-imide present, stirring for 1 to 2 hours and then distilling off the pure adiponitrile.

3. An improved process for the production of pure adiponitrile from the technical reaction mixture obtained by reacting ammonia with adipic acid at 330° to 350° C., which comprises adding a member of the group consisting of hydrocyanic acid and formamide to said crude technical product in amounts sufficient to bind all 1-cyanocyclopentanone-(2)-imide present to form high-molecular reaction products of hydrocyanic acid with said cyano-imide and leading the mixture at about 200° to 300° C. over a catalyst containing free phosphoric acid.

References Cited in the file of this patent

UNITED STATES PATENTS

| | | |
|---|---|---|
| 2,132,849 | Greenewalt et al. | Oct. 11, 1938 |
| 2,242,309 | Lazier et al. | May 20, 1941 |
| 2,305,103 | Osgood | Dec. 15, 1942 |
| 2,361,367 | Davis et al. | Oct. 31, 1944 |
| 2,548,369 | Harwood et al. | Apr. 10, 1951 |

OTHER REFERENCES

Prelog et al.: Chem. Abstracts, vol. 43, p. 7906 (1949).